(12) United States Patent
Xie et al.

(10) Patent No.: US 9,692,863 B2
(45) Date of Patent: *Jun. 27, 2017

(54) COVER-LEAFING LEATHER CASING OF CELLULAR PHONE AND SMART PHONE USING THE SAME

(71) Applicant: HUIZHOU TCL MOBILE COMMUNICATION CO., LTD., Huizhou, Guangdong (CN)

(72) Inventors: Jinhua Xie, Huizhou (CN); Runlai Jiang, Huizhou (CN); Yuanliang Xu, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,947

(22) Filed: Jul. 21, 2016

(65) Prior Publication Data

US 2017/0012660 A1    Jan. 12, 2017

Related U.S. Application Data

(63) Continuation of application No. 14/383,752, filed as application No. PCT/CN2013/074009 on Apr. 10, 2013.

(30) Foreign Application Priority Data

Jan. 29, 2013    (CN) .......................... 2013 1 0033368

(51) Int. Cl.
  *H04M 1/00*    (2006.01)
  *H04M 1/11*    (2006.01)
  (Continued)

(52) U.S. Cl.
  CPC .............. *H04M 1/11* (2013.01); *A45C 11/00* (2013.01); *A45C 13/1069* (2013.01);
  (Continued)

(58) Field of Classification Search
  CPC .. G06F 1/1616; G06F 1/1626; G06F 1/16601; G06F 1/1607; G06F 2200/1634
  (Continued)

(56) References Cited

U.S. PATENT DOCUMENTS

D695,745 S     12/2013  Kim
8,657,112 B2 *  2/2014  Igarashi ................... H05K 5/03
                                                          206/320

(Continued)

FOREIGN PATENT DOCUMENTS

CN    201270893    7/2009
CN    102232689    11/2011
(Continued)

OTHER PUBLICATIONS

Unknown, IPad 2 polyurethane "smart cover", journal, Apr. 2008, p. 72, vol. 29, No. 6, World Plastics, China.
(Continued)

*Primary Examiner* — Duc M Nguyen
(74) *Attorney, Agent, or Firm* — Ladas & Parry LLP

(57) ABSTRACT

A cover-leafing leather casing of cellular phone and a smart phone using the same are described. The cover-leafing leather casing of cellular phone comprises a leather cover for buckling to a touch panel of the smart phone. The leather cover is connected to a first magnet of a rear shell body of the smart phone by way of a magnetic induction connecting portion, and the magnetic induction connecting portion comprises a second magnet which is mutually attracted to
(Continued)

the first magnet. The present invention employs the cover-leafing leather casing to be easily disassembled and to be conveniently cleaned.

12 Claims, 4 Drawing Sheets

(51) Int. Cl.

| | | |
|---|---|---|
| *H04M 1/18* | (2006.01) | |
| *H01F 7/02* | (2006.01) | |
| *A45C 11/00* | (2006.01) | |
| *A45C 13/10* | (2006.01) | |
| *H04B 1/3888* | (2015.01) | |
| *G06F 1/16* | (2006.01) | |

(52) U.S. Cl.
CPC ......... *H01F 7/0252* (2013.01); *H04B 1/3888* (2013.01); *H04M 1/185* (2013.01); *A45C 2011/002* (2013.01); *G06F 1/1607* (2013.01); *G06F 1/1616* (2013.01); *G06F 1/1626* (2013.01); *G06F 2200/1634* (2013.01)

(58) Field of Classification Search
USPC ..................................................... 455/575.8
See application file for complete search history.

(56) References Cited

U.S. PATENT DOCUMENTS

| | | | | |
|---|---|---|---|---|
| 9,128,667 | B2* | 9/2015 | Kim | ................... G06F 1/1626 |
| 9,276,627 | B2* | 3/2016 | Xie | ................... H04B 1/3888 |
| 9,578,150 | B2* | 2/2017 | Xie | ................... H04M 1/11 |
| 2003/0002901 | A1* | 1/2003 | Sellers | ................ G06F 1/1616 |
| | | | | 400/472 |
| 2012/0068798 | A1 | 3/2012 | Lauder | |
| 2012/0228320 | A1 | 9/2012 | Akana | |
| 2012/0268891 | A1 | 10/2012 | Cencioni | |
| 2014/0063709 | A1* | 3/2014 | Kim | ................... G06F 1/1626 |
| | | | | 361/679.3 |
| 2014/0085907 | A1* | 3/2014 | Jun | ................... G09G 3/3208 |
| | | | | 362/362 |
| 2015/0133203 | A1* | 5/2015 | Xie | ................... H04M 1/11 |
| | | | | 455/575.8 |

FOREIGN PATENT DOCUMENTS

| | | |
|---|---|---|
| CN | 202386000 | 8/2012 |
| JP | 2011176623 | 9/2011 |

OTHER PUBLICATIONS

Unknown, What is the priciple of Smart Cover?, Nov. 14, 2012, http://cnbeta.com/articles/214019.htm, China.

* cited by examiner

COVER-LEAFING LEATHER CASING OF CELLULAR PHONE AND SMART PHONE USING THE SAME

CROSS REFERENCE TO RELATED APPLICATION

This patent application is a continuation of application and claims priority of U.S. application Ser. No. 14/383,752, entitled "COVER-LEAFING LEATHER CASING OF CELLULAR PHONE AND SMART PHONE USING THE SAME", which is filed on Sep. 8, 2014, incorporated herein by reference.

BACKGROUND

Field

The present invention relates to a protection cover of smart phone case, and more particularly to a cover-leafing leather casing of cellular phone to be easily disassembled and to be conveniently cleaned in the smart phone.

Background

With the continuous development of mobile communication technology and the rise of the smart phone, there is an increasing demand for a large display size, a diminished thickness, and better protection of the smart phone. For example, a conventional cover-leafing leather casing buckled to the front side of the smart phone to protect the touch panel thereof is provided.

However, the conventional cover-leafing leather casing is directly welded on the battery covering with plastic material by way of ultrasonic or hot melt technique and the battery covering is then fastened to the smart phone case by way of a buckling element on the battery covering. While using the smart phone, it is difficult to disassemble and assemble and to clean up the conventional cover-leafing leather casing. Further, the constant disassembling and assembling easily damages the buckling element of the battery covering, which results in improperly deforming, over-loosening or over-tightening the buckling element, and even fracturing the buckling element.

Consequently, there is a need to develop a novel cover-leafing leather casing to solve the aforementioned problems.

SUMMARY OF THE INVENTION

To solve the aforementioned problems, one objective of the present invention is to provide a cover-leafing leather casing of cellular phone to be easily disassembled and to be conveniently cleaned.

Another objective of the present invention is to provide a smart phone employing the cover-leafing leather casing of cellular phone to be easily disassembled and conveniently cleaned.

According to the above objectives, one embodiment of the present invention sets forth a cover-leafing leather casing of cellular phone comprising: a leather cover, for buckling to a touch panel of a smart phone; wherein the leather cover is connected to a first magnet of a rear shell body of the smart phone by way of a magnetic induction connecting portion, and the magnetic induction connecting portion comprises a second magnet which is mutually attracted to the first magnet; wherein a fourth magnet of the leather cover is used to mutually attract a third magnet fastened to a front shell body of the smart phone, and the fourth magnet is disposed in the other side opposite to a connection side of the leather cover; and wherein a recess slot is disposed in an assembly surface of the magnetic induction connecting portion and the recess slot is used to fasten a bending portion of the leather cover, one side of the recess slot communicates with a lateral surface of the magnetic induction connecting portion, and a plurality of strip ribs disposed on a bottom surface of the recess slot are used to fasten the second magnet.

In the cover-leafing leather casing, the fourth magnet is formed to be embedded to an internal portion of the leather cover.

In the cover-leafing leather casing, a plurality of stationary posts are further disposed on the bottom surface of the recess slot for fastening the leather cover, a plurality of first stationary holes are disposed in the bending portion of the leather cover and adapted for the stationary posts to be passed therethrough, a steel sheet is used to tightly press the bending portion in the recess slot of the magnetic induction connecting portion, and the steel sheet further comprises a plurality of second stationary holes to be passed through the stationary posts.

In the cover-leafing leather casing, the bending portion of the leather cover further comprises a plurality of first notches for preventing an overlapping status between the second magnet and the strip ribs which are used to fasten the second magnet, and the steel sheet further comprises a plurality of second notches for avoiding the overlapping status between the second magnet and the steel sheet.

In the cover-leafing leather casing, a transparent Mylar sheet is covered with a surface of the steel sheet.

Another embodiment of the present invention sets forth a cover-leafing leather casing of cellular phone comprising: a leather cover, for buckling to a touch panel of a smart phone; wherein the leather cover is connected to a first magnet of a rear shell body of the smart phone by way of a magnetic induction connecting portion, and the magnetic induction connecting portion comprises a second magnet which is mutually attracted to the first magnet.

In the cover-leafing leather casing, a fourth magnet of the leather cover is used to mutually attract a third magnet fastened to a front shell body of the smart phone, and the fourth magnet is disposed in the other side opposite to a connection side of the leather cover.

In the cover-leafing leather casing, the fourth magnet is formed to be embedded to an internal portion of the leather cover.

In the cover-leafing leather casing, a recess slot is disposed in an assembly surface of the magnetic induction connecting portion and the recess slot is used to fasten a bending portion of the leather cover, one side of the recess slot communicates with a lateral surface of the magnetic induction connecting portion, and a plurality of strip ribs disposed on a bottom surface of the recess slot are used to fasten the second magnet.

In the cover-leafing leather casing, a plurality of stationary posts are further disposed on the bottom surface of the recess slot for fastening the leather cover, a plurality of first stationary holes are disposed in the bending portion of the leather cover and adapted for the stationary posts to be passed therethrough, a steel sheet is used to tightly press the bending portion in the recess slot of the magnetic induction connecting portion, and the steel sheet further comprises a plurality of second stationary holes to be passed through the stationary posts.

In the cover-leafing leather casing, the bending portion of the leather cover further comprises a plurality of first notches for preventing an overlapping status between the second magnet and the strip ribs which are used to fasten the second magnet, and the steel sheet further comprises a plurality of second notches for avoiding the overlapping status between the second magnet and the steel sheet.

In the cover-leafing leather casing, a transparent Mylar sheet is covered with a surface of the steel sheet.

Still another embodiment of the present invention sets forth a smart phone comprising a cellular phone body and a cover-leafing leather casing which is disposed on a surface of the cellular phone body, and the cover-leafing leather casing of cellular phone comprising a leather cover for buckling to a touch panel of the smart phone; wherein the leather cover is connected to a first magnet of a rear shell body of the smart phone by way of a magnetic induction connecting portion, and the magnetic induction connecting portion comprises a second magnet which is mutually attracted to the first magnet.

In the smart phone, a fourth magnet of the leather cover is used to mutually attract a third magnet fastened to a front shell body of the smart phone, and the fourth magnet is disposed in the other side opposite to a connection side of the leather cover.

In the smart phone, the fourth magnet is formed to be embedded to an internal portion of the leather cover.

In the smart phone, a recess slot is disposed in an assembly surface of the magnetic induction connecting portion and the recess slot is used to fasten a bending portion of the leather cover, one side of the recess slot communicates with a lateral surface of the magnetic induction connecting portion, and a plurality of strip ribs disposed on a bottom surface of the recess slot are used to fasten the second magnet.

In the smart phone, a plurality of stationary posts are further disposed on the bottom surface of the recess slot for fastening the leather cover, a plurality of first stationary holes are disposed in the bending portion of the leather cover and adapted for the stationary posts to be passed therethrough, a steel sheet is used to tightly press the bending portion in the recess slot of the magnetic induction connecting portion, and the steel sheet further comprises a plurality of second stationary holes to be passed through the stationary posts.

In the smart phone, the bending portion of the leather cover further comprises a plurality of first notches for preventing an overlapping status between the second magnet and the strip ribs which are used to fasten the second magnet, and the steel sheet further comprises a plurality of second notches for avoiding the overlapping status between the second magnet and the steel sheet.

In the smart phone, a transparent Mylar sheet is covered with a surface of the steel sheet.

The present invention provides a cover-leafing leather casing of cellular phone and a smart phone thereof, which employs a first magnet and a second magnet to be mutually attracted for connecting the cover-leafing leather casing to the cellular phone body without connection traces to allow the cover-leafing leather casing to be easily disassembled and to be conveniently cleaned. Thus, the life-span of the cover-leafing leather casing is extended and the damage of the buckling element of the battery covering is avoided.

DETAILED DESCRIPTION OF THE PREFERRED EMBODIMENTS

The foregoing aspects and many of the attendant advantages of this invention will become more readily appreciated as the same becomes better understood by reference to the following detailed description but rather than limiting of the present invention.

Figure 1:
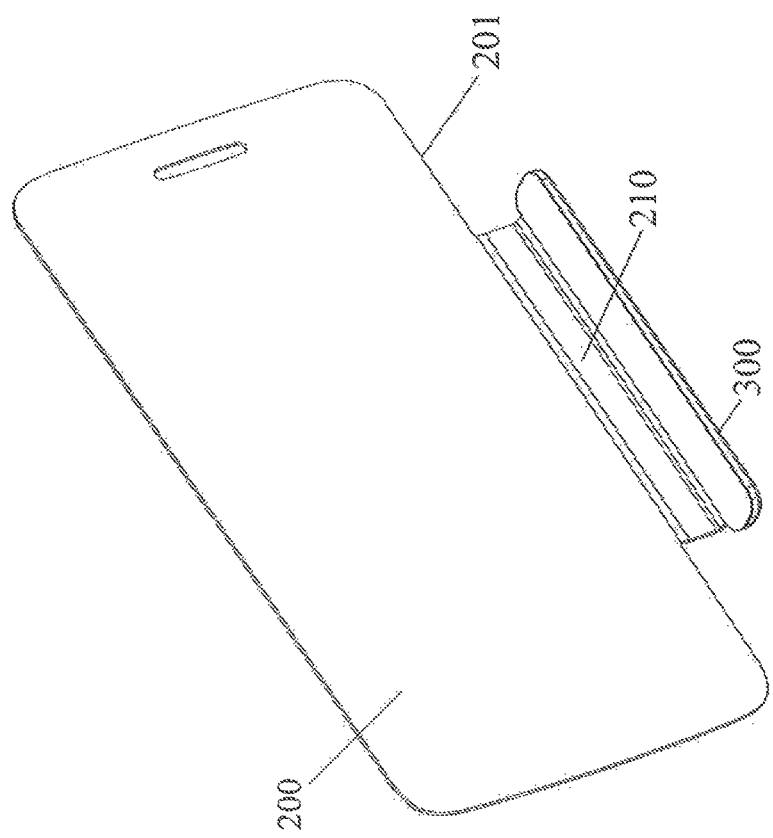
FIG. 1 is a schematic view of a cover-leafing leather casing of cellular phone according to one embodiment of the present invention.

As shown in FIG. 1, it is a schematic view of a cover-leafing leather casing of cellular phone according to one embodiment of the present invention. The cover-leafing leather casing of cellular phone includes a leather cover 200 and a magnetic induction connecting portion 300. A connection side 201 of the leather cover 200 forms an partial extending portion to serve as a bending portion 210 of the leather cover 200. The magnetic induction connecting portion 300 is disposed on the bending portion 210 for mounting one side of the leather cover 200 on the shell body of the smart phone.

Figure 2:
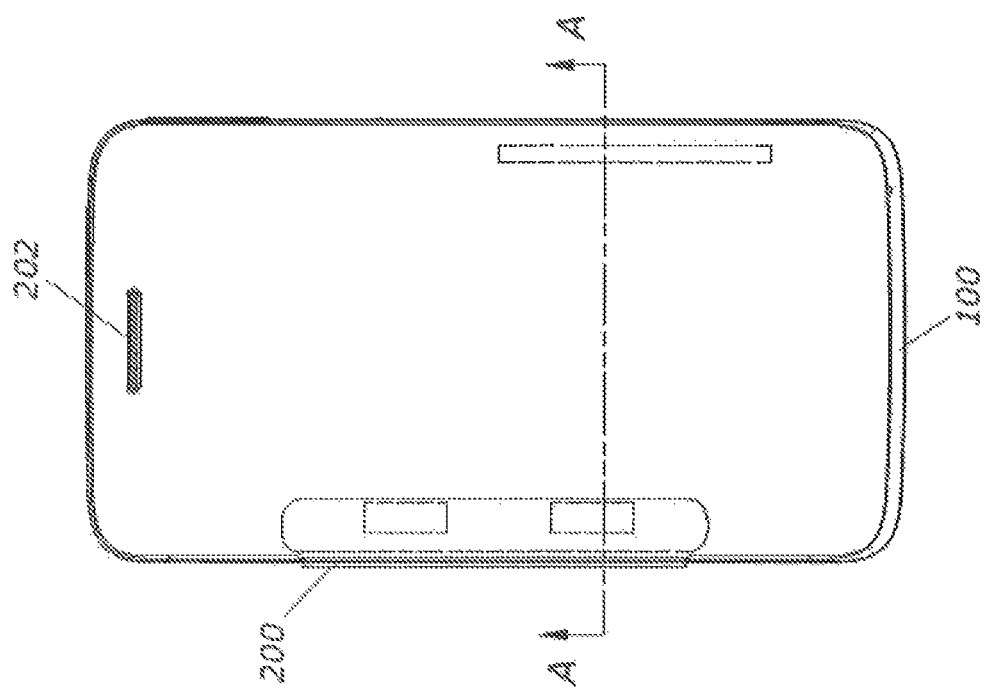
FIG. 2 is a schematic front side view of the smart phone according to one embodiment of the present invention.

Referring to FIG. 2, it is a schematic front side view of the smart phone according to one embodiment of the present invention. The leather cover 200 is fastened to touch panel of the smart phone 100 for protecting the screen of the touch panel from damage. A hollow opening 202 is disposed in the upper portion of the leather cover 200 and receives the calls when the leather cover 200 is covered with the smart phone 100 to prevent the finger, cheek or ear from contacting the touch panel, which affects the communication.

Figure 3:
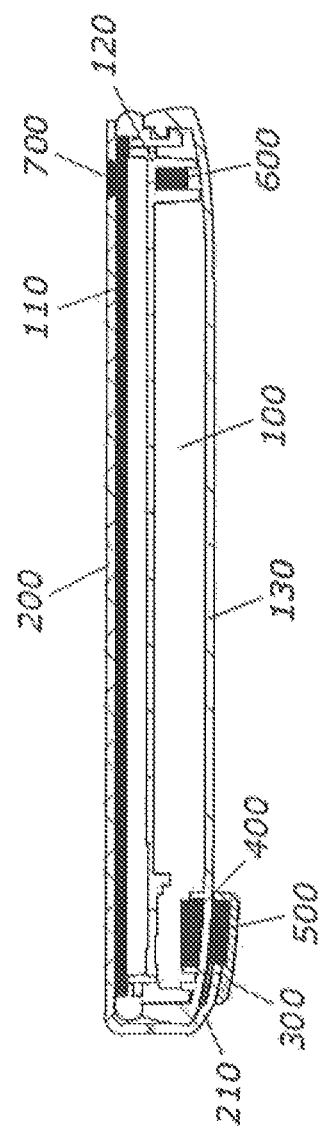
FIG. 3 is a schematic cross-sectional enlarged view of the smart phone along line A-A according to one embodiment of the present invention.

FIG. 3 is a schematic cross-sectional enlarged view of the smart phone along line A-A according to one embodiment of the present invention. The bending portion 210 of the leather cover 200 is connected to the first magnet 400 of the rear shell body 130 by way of the magnetic induction connecting portion 300. By using the first magnet and second magnet, the leather cover is connected to the smart phone case based on the physical characteristic of the magnetic attraction of the magnets so that the cover-leafing leather casing of cellular phone is easily disassembled and conveniently cleaned.

Specifically, the first magnet 400 is fastened to an internal side of the rear shell body 130 and the magnetic induction region of the first magnet 400 reaches the external side opposite to the internal side of the rear shell body 130. Correspondingly, the second magnet 500 fastened to the magnetic induction connecting portion 300 is used to mutually attract the first magnet 400. When the second magnet 500 disposed in the external side of the rear shell body 130 enters the magnetic induction region of the first magnet 400, a mutual magnetic attraction force between the first magnet 400 and the second magnet 500 is generated so that the magnetic induction connecting portion 300 is attached to the external side of the rear shell body 130. Thus, the leather cover 200 is capable of connecting to the rear shell body 130 of the smart phone 100 by way of the magnetic induction connecting portion 300. Further, after the leather cover 200 is removed from the smart phone, there is no connection traces on the rear shell body 130. Therefore, the cover-leafing leather casing is easily disassembled and the case of smart phone 100 is conveniently cleaned to maintain the cover-leafing leather casing sanitary.

In one preferred embodiment of the cover-leafing leather casing of cellular phone according to present invention, a third magnet 600 is fastened to the front shell body 120 of the smart phone 100 and the magnetic induction region of the third magnet 600 reaches the external side of the touch panel 110. Correspondingly, a fourth magnet 700 fastened to the leather cover 200 is used to mutually attract the third magnet 600. When the leather cover 200 is buckled, the fourth magnet 700 enters the magnetic induction region of the third magnet 600. Thus, a mutual magnetic attraction force between the fourth magnet 700 and the third magnet 600 is generated so that the leafing side of the leather cover 200 is attached to the touch panel 110 to be locked for preventing the leather cover 200 from arbitrarily leafing.

Figure 4:
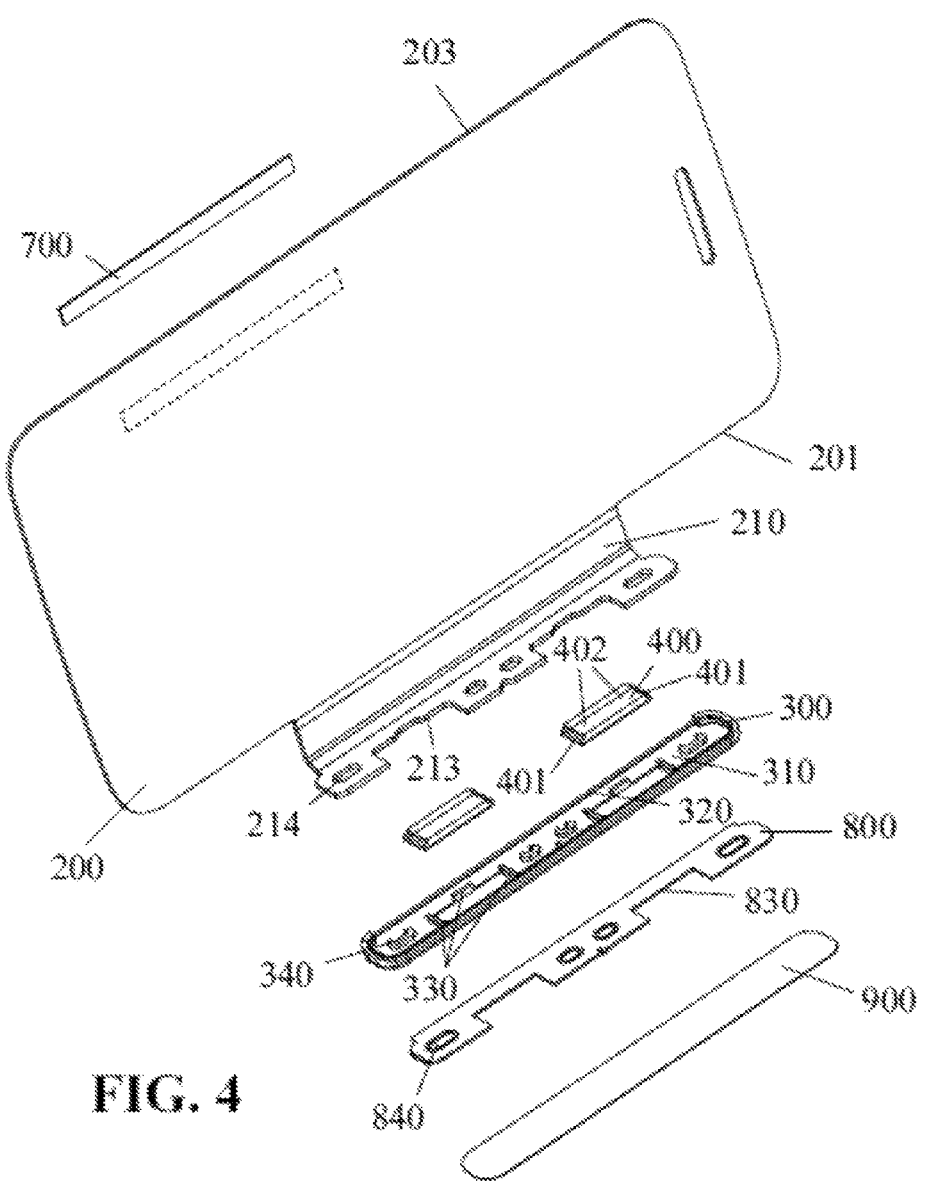
FIG. 4 is a schematic exploded view of the cover-leafing leather casing of cellular phone according to one embodiment of the present invention.

FIG. 4 is a schematic exploded view of the cover-leafing leather casing of cellular phone according to one embodiment of the present invention. The fourth magnet 700 forms a strip shape to be embedded to the internal portion of the leather cover 200 in order to conveniently clean the leather cover 200. The fourth magnet 700 is disposed in a free side 203 opposite to the connection side 201 of the leather cover 200, i.e. the other side opposite to the connection side 201. Preferably, the fourth magnet 700 is disposed in the lower and middle position of the leather cover 200 for conveniently leafing the leather cover 200 by way of fingers.

Further, a recess slot 310 is disposed in the assembly surface of the magnetic induction connecting portion 300 and the recess slot 310 is used to fasten the bending portion 210 of the leather cover 200 to reduce the thickness of the magnetic induction connecting portion 300. One side of the recess slot 310 communicates with the lateral surface of the magnetic induction connecting portion 300 for conveniently containing the bending portion 210 of the leather cover 200. A plurality of strip ribs 330 disposed on the bottom surface of the recess slot 310 are used to fasten the second magnets 400. Each of the end portions of the second magnet 400 includes a step portion 401. After the magnetic induction connecting portion 300 is assembled, the flip portions of the strip ribs 330 near the end portions of the second magnet 400 are correspondingly buckled up with the step portions 401 of the second magnet 400 respectively. After the magnetic induction connecting portion 300 is assembled, the strip rib 330 near the lateral portion 402 of the second magnet 400 is adapted for the internal side of the recess slot 310 at a predetermined direction to fasten the second magnet 400.

Moreover, a plurality of stationary posts 340 are further disposed on the bottom surface of the recess slot 310 for fastening the leather cover 200. Correspondingly, a plurality of first stationary holes 214 are disposed in the bending portion 210 of the leather cover 200 and the first stationary holes 214 are adapted for the stationary posts 340 to be passed therethrough. A steel sheet 800 is used to tightly press the bending portion 210 of the leather cover 200 in the recess slot 310 of the magnetic induction connecting portion 300. The steel sheet 800 further includes the second stationary holes 840 to be passed through the stationary posts 340. The lateral side of the recess slot 310 further includes a buckling rib 320 which is adapted for the steel sheet 800 to tightly press the leather cover 200. The steel sheet 800 is capable of pressing the bending portion 210 of the leather cover 200 and the magnetic induction connecting portion 300 together and the steel sheet 800 is attached to the stationary posts 340 by way of laser welding manner.

In one embodiment, the bending portion 210 of the leather cover 200 further includes the first notches 213 for preventing the overlapping status between the second magnet 400 and the strip ribs 330 which are used to fasten the second magnets 400. The steel sheet 800 further includes the second notches 830 for avoiding the overlapping status between the second magnet 400 and the steel sheet 800 to reduce the thickness of the magnetic induction connecting portion 300.

Additionally, in one embodiment, a transparent Mylar sheet 900 is covered with the surface of the steel sheet 800 so that the external appearance of the components of cover-leafing leather casing are hidden to be aesthetic, openhanded and cleaned conveniently.

Based on the aforementioned cover-leafing leather casing of cellular phone, the present invention provides a smart phone including a cellular phone body and a cover-leafing leather casing which is disposed on the surface of the cellular phone body. The first magnet 400 is disposed in the internal side of the rear shell body 130. The cover-leafing leather casing is applicable to the cover-leafing leather casing of cellular phone in the above-mentioned embodiments. Further, the third magnet 600 is disposed in the front shell body 120. There is no connection traces between the cellular phone body and the cover-leafing leather casing. If there is no need to cover the cellular phone by the cover-leafing leather casing, it is required to slightly pull and drag the magnetic induction connecting portion for separating the cover-leafing leather casing from the cellular phone body, which is operated easily and avoids the jamming, pushing and embedding operations. Therefore, the cover-leafing leather casing of cellular phone is easily disassembled and is conveniently cleaned to satisfy the user habits.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A cover-leafing leather casing of cellular phone, the cover-leafing leather casing comprising:
   a leather cover, for buckling to a touch panel of a smart phone;
   wherein the leather cover is connected to a first magnet of a rear shell body of the smart phone by way of a magnetic induction connecting portion, and the magnetic induction connecting portion comprises a second magnet which is mutually attracted to the first magnet;
   wherein a recess slot is disposed in an assembly surface of the magnetic induction connecting portion and the recess slot is configured to fasten a bending portion of the leather cover;
   wherein each of a plurality of end portions of the second magnet comprises a step portion.

2. The cover-leafing leather casing of cellular phone of claim 1, wherein when the second magnet disposed in an external side of the rear shell body enters a magnetic induction region of the first magnet, a mutual magnetic attraction force between the first magnet and the second magnet is generated so that the magnetic induction connecting portion is attached to the external side of the rear shell body.

3. The cover-leafing leather casing of cellular phone of claim 1, wherein after the magnetic induction connecting portion is assembled, a plurality of strip ribs near the second magnet are correspondingly buckled up with the step portions of the second magnet respectively.

4. The cover-leafing leather casing of cellular phone of claim 3, wherein after the magnetic induction connecting portion is assembled, each of the strip ribs near lateral portions of the second magnet is adapted for the recess slot at a predetermined direction to fasten the second magnet.

5. The cover-leafing leather casing of cellular phone of claim 1, wherein a fourth magnet of the leather cover is used to mutually attract a third magnet fastened to a front shell body of the smart phone, and the fourth magnet is disposed in the other side opposite to a connection side of the leather cover.

6. The cover-leafing leather casing of cellular phone of claim 5, wherein the fourth magnet is formed to be embedded to an internal portion of the leather cover.

7. A smart phone comprising a cellular phone body and a cover-leafing leather casing which is disposed on a surface of the cellular phone body, and the cover-leafing leather casing of cellular phone comprising a leather cover for buckling to a touch panel of the smart phone;
wherein the leather cover is connected to a first magnet of a rear shell body of the smart phone by way of a magnetic induction connecting portion, and the magnetic induction connecting portion comprises a second magnet which is mutually attracted to the first magnet;
wherein a recess slot is disposed in an assembly surface of the magnetic induction connecting portion and the recess slot is configured to fasten a bending portion of the leather cover;
wherein each of a plurality of end portions of the second magnet comprises a step portion.

8. The smart phone of claim 7, wherein when the second magnet disposed in an external side of the rear shell body enters a magnetic induction region of the first magnet, a mutual magnetic attraction force between the first magnet and the second magnet is generated so that the magnetic induction connecting portion is attached to the external side of the rear shell body.

9. The smart phone of claim 7, wherein after the magnetic induction connecting portion is assembled, a plurality of strip ribs near the second magnet are correspondingly buckled up with the step portions of the second magnet respectively.

10. The smart phone of claim 9, wherein after the magnetic induction connecting portion is assembled, each of the strip ribs near lateral portions of the second magnet is adapted for the recess slot at a predetermined direction to fasten the second magnet.

11. The smart phone of claim 7, wherein a fourth magnet of the leather cover is used to mutually attract a third magnet fastened to a front shell body of the smart phone, and the fourth magnet is disposed in the other side opposite to a connection side of the leather cover.

12. The smart phone of claim 11, wherein the fourth magnet is formed to be embedded to an internal portion of the leather cover.

* * * * *